United States Patent [19]

Oosterkamp

[11] Patent Number: 5,321,731

[45] Date of Patent: Jun. 14, 1994

[54] MODULAR STEAM SEPARATOR WITH INTEGRATED DRYER

[75] Inventor: Willem J. Oosterkamp, Oosterbeek, Netherlands

[73] Assignee: General Electric Company, San Jose, Calif.

[21] Appl. No.: 963,176

[22] Filed: Oct. 19, 1992

[51] Int. Cl.$^5$ ............................................. G21C 15/00
[52] U.S. Cl. ...................................... 376/371; 376/377
[58] Field of Search ............... 376/371, 377, 378, 370; 976/DIG. 22, DIG. 188; 55/348, 485, 505

[56] References Cited

U.S. PATENT DOCUMENTS

| | | | |
|---|---|---|---|
| 3,253,999 | 5/1966 | Weisman | 376/371 |
| 3,339,631 | 9/1967 | McGurty et al. | 165/109 |
| 3,603,062 | 9/1971 | Robbins | 55/348 |
| 3,629,065 | 12/1971 | Knox | 176/54 |
| 3,667,430 | 6/1972 | Hubble et al. | 122/483 |
| 3,902,876 | 9/1975 | Moen et al. | 55/348 |
| 3,961,923 | 6/1976 | Rouhani | 55/457 |
| 4,162,191 | 7/1979 | Cella | 376/260 |
| 4,322,233 | 3/1982 | Sick | 55/426 |
| 4,629,481 | 12/1986 | Echols | 55/348 |
| 4,912,733 | 3/1990 | Gluntz | 376/371 |
| 5,130,082 | 7/1992 | Oosterkamp | 376/371 |

FOREIGN PATENT DOCUMENTS 0459719 12/1991 European Pat. Off. .
2248426 4/1973 Fed. Rep. of Germany .

OTHER PUBLICATIONS

Wolfe and Wilkens, "Improvements in BWR Designs and Safety," ANS Topical Meeting, Seattle, WA, May 1-5, 1988.
Glasstone and Sesonke, *Nuclear Reactor Engineering*, pp. 748-753, 3d ed., Van Nostrand (NY, NY 1981).
Lahey and Moody, *The Thermal Hydraulics of a BWR*, Ch. 2, pp. 15-44, ANS, (LeGrange, Ill. 1977).
Wolf and Moen, "Advances in Steam-Water Separators for BWRs," ASME Paper No. 73-WA/Pwr-4, Nov. 1973.

*Primary Examiner*—Donald P. Walsh
*Assistant Examiner*—Meena Chelliah
*Attorney, Agent, or Firm*—J. S. Beulick

[57] ABSTRACT

The present invention is directed to a modular steam separator with integrated dryer especially adapted for separating and drying steam exiting the core of a nuclear boiling water reactor. The instant modular separator with integrated dryer has a standpipe with a proximal end that is connectable to the upper plenum of the core of the nuclear reactor and a distal end that is connected to a proximal end of a steam separator. A distal end of the steam separator is connected to a steam distribution channel that extends in fluid communication to a steam dryer. The steam dryer has a steam vent for passage of dry steam to the steam dome of the reactor and a water drain connected to the reactor's downcomer region.

18 Claims, 2 Drawing Sheets

MODULAR STEAM SEPARATOR WITH INTEGRATED DRYER

BACKGROUND OF THE INVENTION

The present invention relates to nuclear boiling water reactors (BWRs) that utilize natural circulation and more particularly to providing for an improved steam separator-dryer in such reactor designs.

Existing large BWRs are of the forced-circulation type. In BWRs undergoing power generation operations, reactor coolant, initially in the form of sub-cooled liquid (e.g. water), is circulated by main coolant recirculation devices (e.g. jet pumps or mixed-flow motor-driven pumps) around a path a portion of which is comprised of a core lower plenum region (located at the bottommost section of the reactor), thence through the nuclear core and into a core upper plenum in communication with the core. Flow exiting the core upper plenum then passes through standpipes that lead to an assembly of steam separators. The reactor coolant exiting the nuclear core and passing into the core upper plenum is a two-phase mixture of steam and water, the proportion of which varies depending upon such factors as the power output from the fuel bundles, the amount of sub-cooling present in the coolant entering the fuel bundle, and the amount of flow through the bundles.

Mechanical steam separation is generally utilized to accomplish the separation of the steam from the steam/water mixture exiting the core supplied to the turbine. This separation must be effected because if steam moisture contents are too high in the turbine steam flow, accelerated erosion can occur in the steam lines and on first-stage turbine blades and the efficiency of the turbine is reduced. The steam separator assembly typically consists of a domed or flat-head base on top of which is welded an array of standpipes with a three-stage steam separator, for example, located at the top of each standpipe. One function of the standpipes is to provide a stand-off separation of the larger-diameter steam separators, which are generally arranged in a particularly tightly-compacted arrangement in which external diameters of adjacent separators are nearly touching with each other, so that separated liquid coolant discharged at the bottom of the separator has a more "open" flow path outwardly from the reactor longitudinal axis and out to a downcomer annulus region which lies at the inboard periphery to the reactor pressure vessel.

The steam separator assembly rests on the top flange of the core shroud and forms the cover of the core discharge plenum ("core upper plenum") region. In each separator, the steam/water mixture rising through the standpipes (the "standpipe region") impinges upon vanes which give the mixture a spin, thus enabling a vortex wherein the centrifugal forces separate the water from the steam in each of three stages. Steam leaves the separators at the top of this assembly and passes into a wet steam plenum below a dryer assembly. The separated water exits from the lower end of each stage of each separator and enters a pool or "downcomer region" that surrounds the standpipes to join the downcomer flow. From each dryer in the dryer assembly exits substantially moisture-free steam that is used to drive a turbine generator which, in turn, is coupled electrically to a grid.

The steam separator assemblies heretofore known in the art are typically bolted to the core shroud flange by long hold-down bolts, or the separator assembly together with the dryer assembly are held down onto the core shroud flange by contact from the reactor head when the latter is assembled to the reactor vessel. However, as shown, for example, in U.S. Pat. Nos. 4,912,733 and 3,902,876, the steam separator assembly and the dryer assembly are not integrated; but, instead, are present in the reactor pressure vessel (RPV) housing the reactor as discrete components. As a consequence, during refueling of the reactor core, separate storage pools are needed to store the respective assemblies until the refueling operations are completed. The need for those separate storage pools generally is seen as adding to the expense of a nuclear reactor system.

Moreover, considering that full-scale testing of separator-dryer combinations can only be accomplished in operating reactors and that, pursuant to current practice, there must be a minimum distance between the top of the separator and the bottom of the dryer, it may be seen that not all combinations of conventional separators and dryers may be experimentally tested. Consequently, there remains a need for an improved and modular steam separator and dryer assembly adapted for testing in existing experimental facilities.

BROAD STATEMENT OF THE INVENTION

The present invention is directed to a modular steam separator with integrated dryer especially adapted for separating and drying steam exiting the core of a nuclear boiling water reactor. The instant modular separator with integrated dryer has a standpipe with a proximal end that is connected to the upper plenum of the core of the nuclear reactor and a distal end connected to a proximal end of a steam separator. A distal end of the steam separator is connected to a steam distribution channel that extends in fluid communication to a steam dryer. The steam dryer has a steam vent for passage of dry stream to the stream dome of the reactor and a water drain connected to the reactor's downcomer region. By integrating a steam separator and steam dryer into a modular unit, the wet steam plenum of the nuclear reactor may be eliminated. The modular design of the instant steam separator with integrated dryer facilitates its removal from the reactor to allow for the full-scale testing of various separator-dryer integrated combinations. Moreover, during reactor refueling operations, the instant separator with integrated dryer may be stored in a single storage pool, thereby eliminating the expense of having to provide for separate storage pools. These and other advantages will be readily apparent to those skilled in the art based upon the disclosure contained herein.

These drawings will be described in detail below.

DETAILED DESCRIPTION OF THE INVENTION

Figure 1:
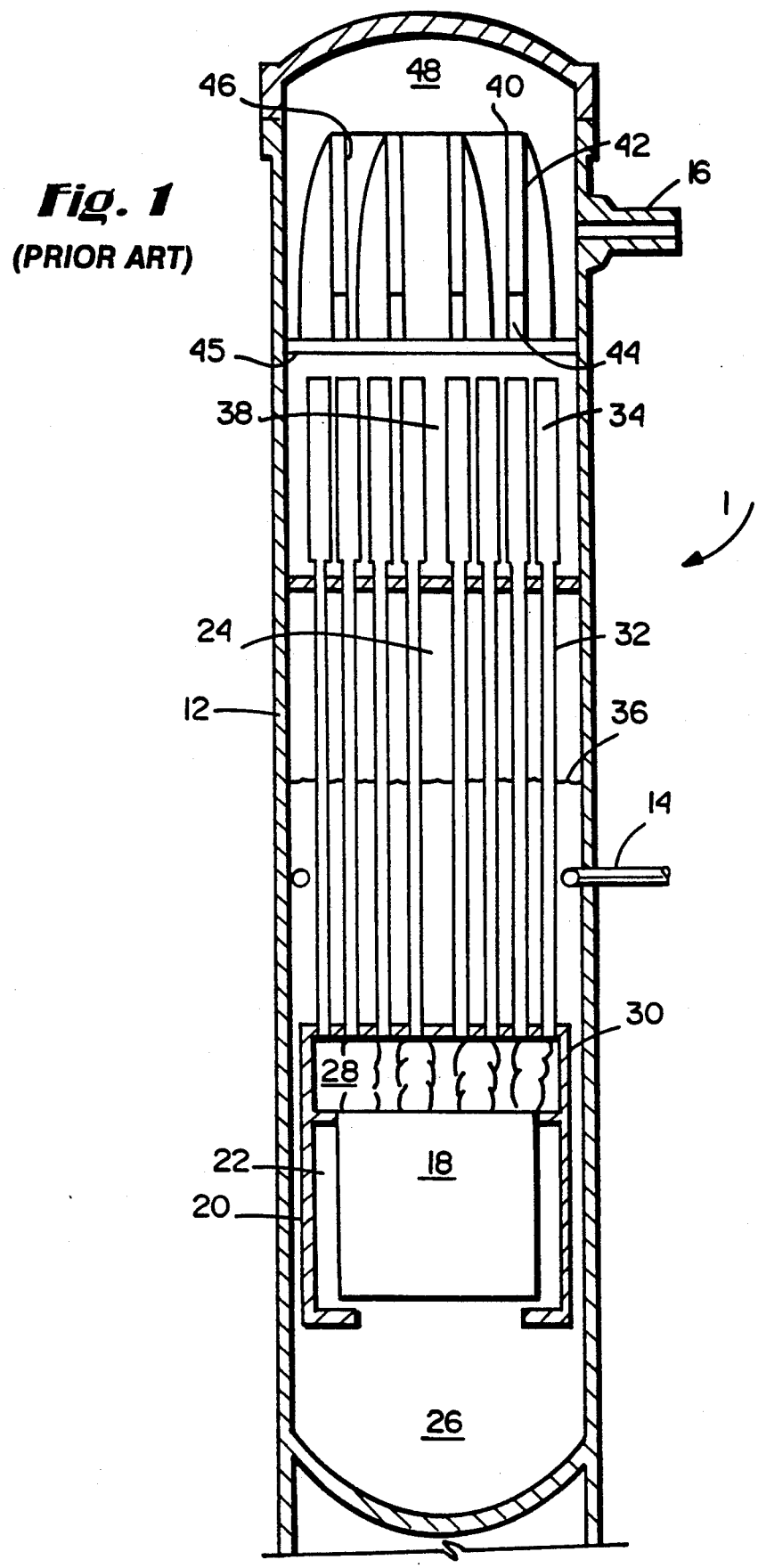
FIG. 1 is a simplified, cross-sectional elevational view of a conventional boiling water reactor.

In order to appreciate the conventional wisdom of steam separator and dryer design, reference is made FIG. 1 which shows a simplified BWR generally at 10.

BWR 10 may be seen to comprise a reactor pressure vessel (RPV), 12, configured to admit feedwater via a feedwater inlet, 14, and to exhaust steam via a steam outlet, 16, thus providing for the ultimate operation of the BWR. A nuclear core, 18, is provided and is disposed within a core shroud, 20. Core shroud 20 and RPV 12 define a core annulus region, 22, through which sub-cooled water flowing downwardly through a downcomer region, 24, may enter a core lower plenum region identified at 26 before flowing through core 18. A water and steam mixture exits core 18 and flows into a core upper plenum region identified at 28, which is defined by a shroud head, 30, disposed atop core 18. From core upper plenum 28, the two-phase mixture enters a plurality of standpipes, 32, which, together with RPV 12, define downcomer region 24. Standpipes 32 are disposed atop shroud head 30 and extend in fluid communication between core upper plenum 28 and a corresponding number of individual steam separators, 34. Steam separators 34 have outlet communications for water separated from the two-phase mixture flowing therethrough to enter downcomer region 24. The separated water in downcomer region 24 combines with the feedwater entering from inlet 14 to provide an accumulation of water for continuous and endless flow through core 18. A representative water level is shown at 36.

Steam separators 34 also have outlet communications for wet steam to pass into a wet steam plenum region identified at 38. Conventionally, a separate dryer assembly, 40, is provided having inlets, 42, in fluid communication with wet steam plenum 38. The collective steam throughput of steam separators 34 is, accordingly, passed into wet steam plenum 38 and then, via inlets 42, into dryer assembly 40. Water removed from the steam is returned to downcomer region 24 via drains, 44. The dried steam, essentially water-free, is passed via outlets, 46, into a steam dome region, identified at 48, to be withdrawn from RPV 12 via steam outlet 16. A wall, 45, separates dryer assembly 40 and steam dome region 48 from wet steam plenum 38.

Figure 2:
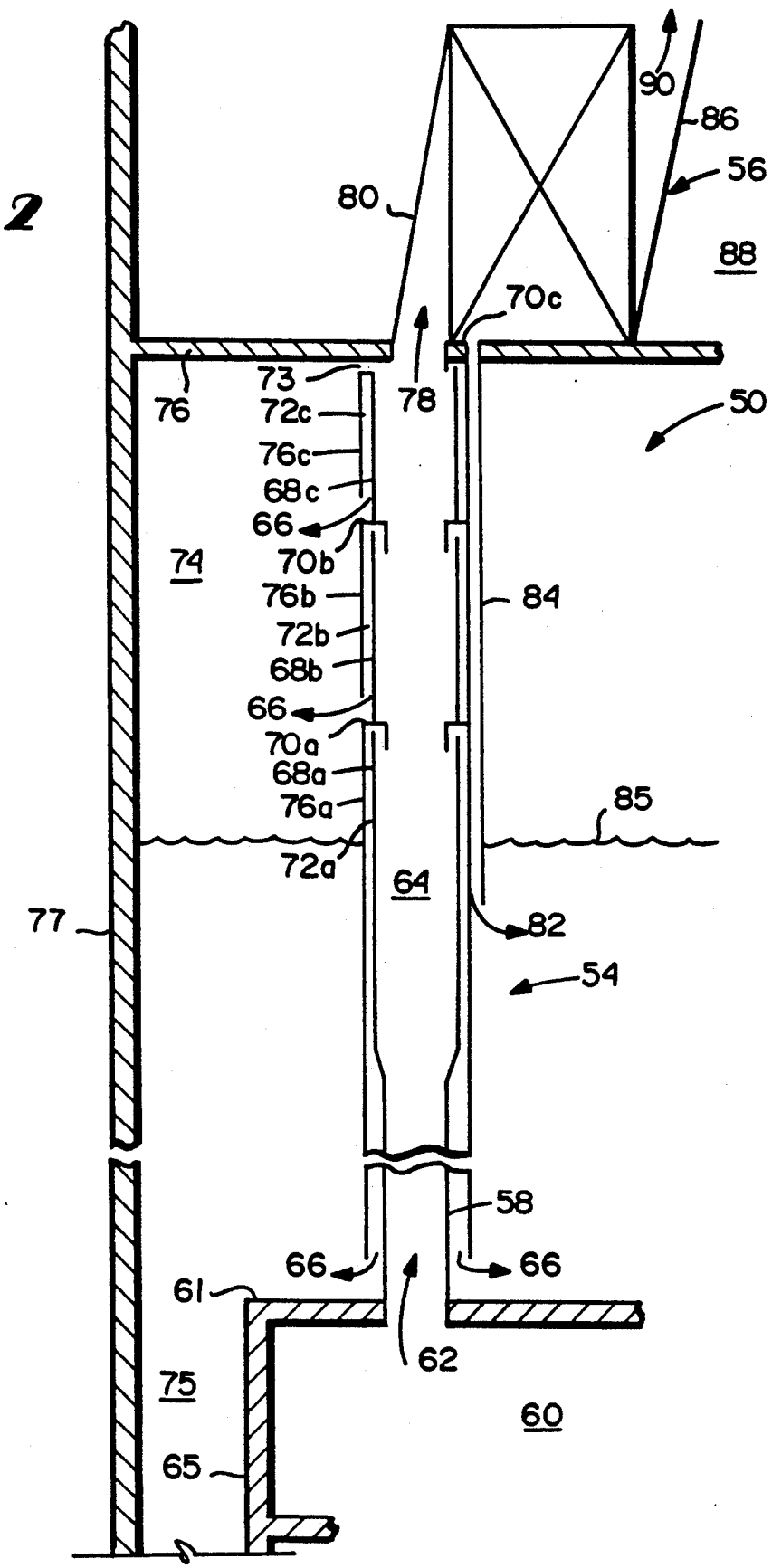
FIG. 2 is a schematic illustration of an enlarged portion of a BWR showing the incorporation thereinto a modular steam separator and integrated dryer in accordance with the invention.

Looking now to FIG. 2, the instant, inventive modular steam separator with integrated dryer is shown generally at 50 as a steam separator, 54, having an integrated steam dryer, 56. Steam separator 54, for example, may be of a conventional centrifugal type. See U.S. Pat. No. 3,902,876 and Wolf et al., "Advances in Steam-Water Separators for Boiling Water Reactors", ASME Paper No. 73-WA/Pwr-4, November 1973. Steam dryer 56, for example, may have internal vanes. Modular steam separator with integrated dryer 50 may be especially adapted for employment in either forced or natural circulation BWRs such as, for example, conventional BWRs, the advanced BWR (ABWR), and the simplified BWR (SBWR). Reactor internals, construction and operation are well known in the art, such as illustrated by reference to the following publications: Glasstone and Sesonske, *Nuclear Reactor Engineering*, pp. 748–753, 3d Edition, VanNostrand, Reinholt (New York, N.Y., 1981); Wolfe and Wilkens, "Improvements in Boiling Water Reactor Designs and Safety", presented at the American Nuclear Society Topical Meeting, Seattle, Wash., May 1–5, 1988; Duncan and McCandless, "An Advanced Simplified Boiling Water Reactor", presented at the American Nuclear Society Topical Meeting, Seattle, Wash., May 1–5, 1988; and Lahey and Moody, *The Thermal Hydraulics of a Boiling Water Nuclear Reactor*, especially Chapter 2, pp. 15–44, American Nuclear Society (LeGrange Park, Ill. 1977). Conventional BWRs, the ABWR and the SBWR all are described and discussed in the foregoing references, each of which is expressly incorporated herein by reference.

Advantageously, a multiplicity of modular steam separators with integrated dryers 50 may be incorporated into a BWR, thereby eliminating the need for a wet steam plenum, and discrete steam separator and dryer components. The incorporation of modular steam separator with integrated dryer 50 into a BWR may be effected by connecting the proximal end of standpipe 58 of steam separator 54 to an outlet in core upper plenum 60. Core upper plenum 60 may be seen to be defined by shroud head 61 of core shroud 65. A two-phase water and steam mixture, 62, formed from the passage of feedwater and recycled coolant in heat transport relationship with the reactor core may be passed into steam separator 54 from core upper plenum 60 via standpipe 58. As water and steam mixture 62 is transported through barrel 64 of steam separator 54, a helical motion may be imparted thereto by an inlet swirler positioned at the proximal end of barrel 64 for the purpose of generating centrifugal forces to effect separation of the entrained water from the steam. As a result of the helical motion imparted to water and steam mixture 62 by the inlet swirler, a portion of the denser water phase, 66, of water and steam mixture 62 is directed to vanes 68a–c in each of three representative stages of steam separator 54. In each of the representative stages shown, separated water phase 66 is removed form barrel 64 via, respectively, pickoff rings 70a–c and is passed via annuli 72a–c into downcomer region 74 for addition to the feedwater of the reactor via core annulus 75 which is defined by the region bounded by shroud 65 and reactor pressure vessel 77. Annuli 72a–c are formed within the regions bounded by outer skirts 76a–c and vanes 68a–c. To prevent any entrained steam separated by a free surface separation mechanism from water phase 66 from bypassing steam dryer 56, steam connection 73 is provided for its passage to steam dryer 56 via barrel 64.

Separated steam phase 78 is passed from the distal end of steam separator 54 into steam dryer 56 via a steam inlet distribution channel, 80. Preferably, steam inlet distribution channel 80 decreases in cross-sectional area as it extends in fluid communication from barrel 64 into dryer 56. Within dryer 56, any unseparated water, 82, is removed from steam phase 78 and is passed into downcomer region 74 via dryer drain 84. Drain 84 may be seen to extend below water level 85 for addition of unseparated water 82 to the feedwater of the reactor via core annulus 75. Dried steam phase 90, now essentially moisture-free, is passed via vent 86 into steam dome region 88 for ultimate use as the working fluid for a turbine used, for example, in the generation of electric power. A wall, 76, separates steam dome region 88 from downcomer region 74. Preferably, vent 86 increases in cross-sectional area as it extends away from steam dryer 56.

Regarding materials of construction, preferably all components are manufactured from materials appropriate for their use within a nuclear BWR. Since certain modification can be made in accordance with the precepts of the present invention, the description herein is illustrative rather than limitative.

I claim:

1. In a boiling water reactor of a type wherein housed within a reactor pressure vessel having an inlet for supplying feedwater and a steam outlet connected to a steam dome is a nuclear core disposed within a shroud having a shroud head within which is formed a core upper plenum for containing a two-phase mixture of steam-water discharged from the core, the shroud and the reactor pressure vessel defining an annulus extending from a downcomer region to a core lower plenum disposed beneath the reactor core and in fluid communication with the core upper plenum, the improvement which comprises a modular steam separator and integrated dryer comprising:

a standpipe having a proximal end connected to the core upper plenum and having a distal end;

a steam separator having a proximal end connected to said standpipe distal end and having a distal end; and a steam dryer having a steam inlet distribution channel in fluid communication with said steam separator distal end, a steam vent in fluid communication with the steam dome, and a water drain connected to said downcomer region, said standpipe, said steam separator, and said steam dryer being connected to one another to effect separation of the steam-water discharged from the core in two stages such that the steam supplied through said steam outlet to said steam dome passes through said steam separator and said steam dryer, respectively.

2. The modular steam separator and integrated dryer of claim 1 wherein said steam separator is of a centrifugal type.

3. The modular steam separator and integrated dryer of claim 1 wherein said steam dryer has internal vanes.

4. The modular steam separator and integrated dryer of claim 1 wherein said steam inlet distribution channel decreases in cross-sectional area from said steam separator distal end to said steam dryer.

5. The modular steam separator and integrated dryer of claim 1 wherein said steam vent increases in cross-sectional area away from said steam dryer.

6. The modular steam separator and integrated dryer of claim 1 further comprising a steam connection for fluid communication of the downcomer region with said steam separator.

7. The modular steam separator and integrated dryer of claim 1 wherein said water drain extends below the feedwater level of the RPV.

8. In a method for separating and drying steam from a two-phase mixture having a water and a steam component formed from the passage of feedwater in a heat transfer relationship with the core of a boiling water reactor wherein the core is housed within a reactor pressure vessel having a feedwater inlet and a steam outlet connected to a steam dome and is disposed within a shroud having a shroud head within which is formed a core upper plenum, the shroud and the reactor pressure vessel defining an annulus extending from a downcomer region to a core lower plenum disposed beneath the reactor core and in fluid communication with the core upper plenum, the improvement which comprises:

(a) passing said two-phase mixture into a modular steam separator and integrated dryer wherein;
a standpipe is connected in fluid communication to the core upper plenum;
a steam separator is connected in fluid communication to said standpipe; and
a steam dryer having a steam inlet distribution channel in fluid communication with said steam separator, a steam vent in fluid communication with the steam dome, and a water drain connected to said downcomer region is connected to said steam separator;

(b) separating at least a portion of the water component from the two-phase mixture of step (a) in said steam separator;

(c) drying the two-phase mixture from step (b) in said steam dryer to separate additional water from the steam component; and (d) effecting separation of the steam and water components discharged from the core into the upper plenum in two stages such that the steam supplied through the steam outlet to the steam dome passes through the steam separator and the steam dryer, respectively.

9. The method of claim 8 wherein said steam separator is of a centrifugal type.

10. The method of claim 8 wherein said steam dryer has internal vanes.

11. The method of claim 8 wherein said steam inlet distribution channel decreases in cross-sectional area from said steam separator to said steam dryer.

12. The method of claim 8 wherein said steam vent increases in cross-sectional area away from said steam dryer.

13. The method of claim 8 further comprising the step of passing the separated water from step (b) into the downcomer region.

14. The method of claim 8 further comprising the step of passing the separated water from step (c) into the downcomer region via said water drain.

15. The method of claim 8 further comprising the step of passing the steam component from step (c) into the steam dome via the steam vent.

16. The method of claim 8 wherein a steam connection is provided for fluid communication of the downcomer region with said steam separator.

17. The method of claim 8 wherein said water drain extends below the feedwater level of the reactor pressure vessel.

18. The modular steam separator and integrated dryer of claim 1 wherein said steam dryer has internal vanes and a steam connection affording communication between said downcomer region and said steam separator.

* * * * *